350-166.

05-02-72 OR 3,659,918 SR

United States Patent

Tan

[15] 3,659,918

[45] May 2, 1972

[54] COLOR SEPARATING PRISM SYSTEM

[72] Inventor: Sing Liong Tan, Emmasingel, Eindhoven, Netherlands

[73] Assignee: U.S. Philips Corporation, New York, N.Y.

[22] Filed: Mar. 24, 1970

[21] Appl. No.: 22,178

[52] U.S. Cl. ............................350/166, 178/5.2, 350/171, 350/311

[51] Int. Cl. ............................G02b 5/28

[58] Field of Search ............................350/1, 163–166, 350/169, 171, 172, 311; 178/5.2

[56] References Cited

UNITED STATES PATENTS

| | | | |
|---|---|---|---|
| 2,392,978 | 1/1946 | Dimmick | 350/166 UX |
| 2,560,351 | 7/1951 | Kell et al. | 350/171 X |
| 3,202,039 | 8/1965 | De Lang et al. | 350/166 |

*Primary Examiner*—David Schonberg
*Assistant Examiner*—Toby H. Kusmer
*Attorney*—Frank R. Trifari

[57] ABSTRACT

A color separating prism system for a television camera including several dichroic layers arranged at angles of less than 30° to a plane normal to the optical axis, which layers are successively struck by the light rays which traverse the prism system, light within a given wavelength range being reflected at each respective layer. Such a color separating prism system increases the efficiency of the incident light and renders the response times of the three channels more equal to one another and to the lowest response time by providing at least one partially reflecting layer in the prism system in an airgap adjoining a dichroic layer.

6 Claims, 3 Drawing Figures

INVENTOR.
SING LIONG TAN
BY
AGENT

COLOR SEPARATING PRISM SYSTEM

The invention relates to a color separating prism system having several dichroic layers arranged at angles of less than 30° to a plane normal to the optical axis, which layers are successively struck by the light rays traversing the prism system, light in a given wavelength range being reflected at the respective layer. The invention also relates to a television camera which includes such a prism system.

Such a prism system is known. The incident light travels through a first prism which at the rear is coated with a dichroic layer which reflects light within a first wavelength range, for example blue light. The light which passes through this dichroic layer traverses a second prism the rear surface of which is coated with a dichroic layer which reflects light only in a second wavelength range, for example, red light. After the incident light has passes through the two dichroic layers, a third component, the green component, is left. The reflected blue and red components are reflected at a total reflecting layer, for example an air glass interface, and then emerge from the prisms. The blue, red and green light components emerging from the prism system then may be supplied to different camera tubes, as is the case, for example, in a color television camera.

In such a camera frequently tubes of the "Plumbicon" type are used.

Figure 1:
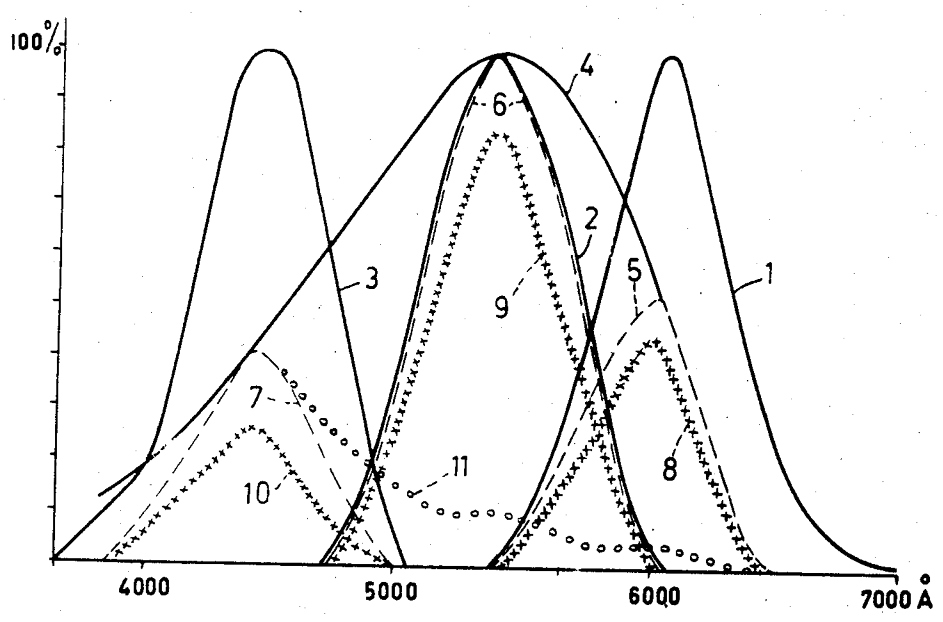
Figure 2:
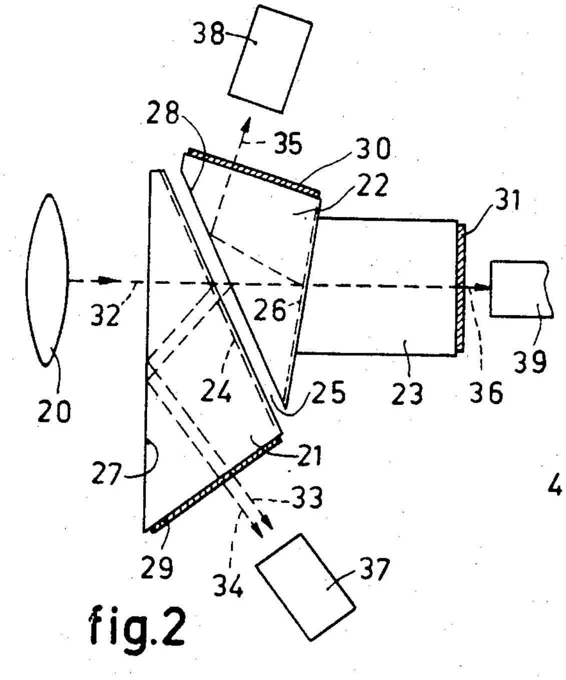
Figure 3:
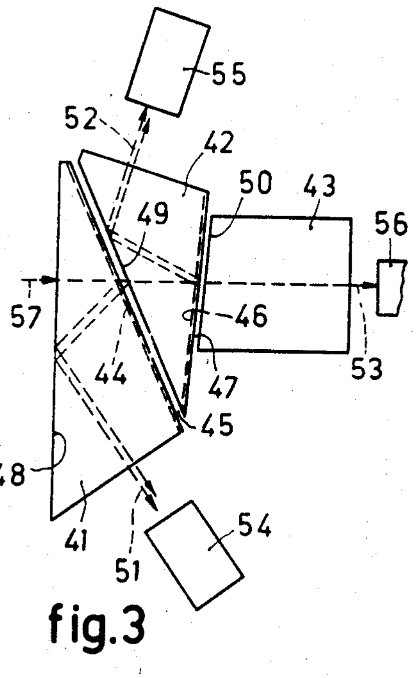

The invention will now be described more fully with reference to the accompanying diagrammatic drawings, in which FIG. 1 shows spectral sensitivity curves for camera tubes FIG. 2 shows an embodiment of an existing color separating prism system, and FIG. 3 shows an embodiment of such a system according to the invention.

In FIG. 1, curves 1, 2 and 3 show the desired relative spectral sensitivity distributions of the three color channels red, green and blue (R, G and B) in a color television camera using "Plumbicon" type tubes. The term "channel" is used herein to mean a light path which includes a dichroic layer and the camera tube which is struck by light of the wavelength reflected by the said layer. Curve 4 of FIG. 1 is the spectral sensitivity curve of a Plumbicon-type tube for a color temperature of 3,200° K. If the color separation in the television camera were ideal, owing to the form of the spectral sensitivity curve 4 of a "Plumbicon" type tube the spectral sensitivity distributions of the three channels R, G and B would have the form indicated by curves 5, 6 and 7, the curve 6 coinciding with the curve 2. Thus, the distribution between the channels is highly uneven. The areas under the curves 5, 6 and 7 are greatly different. In practice, the steep slopes of the ideal curves 1, 2 and 3 and hence the ideal curves 5, 6 and 7 for a "Plumbicon" type tube prove to be unobtainable by means of dichroic layers. In order to obtain the desired slopes the prisms are provided with absorption filters. However, because these filters are not loss-free, the curves, 1, 2 and 3 and hence the curves 5, 6 and 7 which are the ideal ones for a Plumbicon-type tube must be replaced by curves having lower peaks. The losses in the blue channel especially are high, as may readily be appreciated from FIG. 2, which shows an existing prism system. A filter 29 is provided to suppress a parasitic image 34 produced by the reflection at the air glass interface in an airgap 25. The spectral sensitivity distribution for the blue channel now has the form of a curve 10 the peak of which is considerably lower than that of the curve 7.

Instead of the ideal curves 1, 2 and 3, in practice in a color television camera having a color separating prism system the curves 8, 9 and 10 are obtained for the relative spectral sensitivity distributions of the three channels R, G and B, respectively. The differences between the curves 1, 2 and 3 and the curves 8, 9 and 10 are due to:

the spectral sensitivity curves of the "Plumbicon" type tubes, the non-ideal reflection curves of the dichroic layers, the non-loss-free absorption filters.

Practice has shown that, putting the signal current for a "Plumbicon" type tube at 100 percent for white light, signal currents of 12 percent in the red channel, of 24 percent in the green channel and of 9 percent in the blue channel are left, so that the signal efficiency of the incident light is only 45 percent.

Apart from the poor efficiency, there is the disadvantage that the three camera tubes have different operating points. The operating point is a point of the curve which shows the signal current as a function of the illumination intensity, and it is determined by the maximum luminance to be expected. Owing to the different operating points, the three camera tubes have different response times. As a result, in taking images of moving objects colored smears occur. This is particularly objectionable for the blue channel, because statistically the "Plumbicon" type tube included in this channel frequently receives no or little light, because signals in which the blue component of the spectrum is small are frequent. Thus, the respective "Plumbicon" type tube exhibits an additional slowness of response.

It is an object of the invention to obviate the said disadvantages. For this purpose, the invention is characterized in that the prism system includes at least one partly reflecting layer, each such layer being disposed in an airgap adjoining a dichroic layer.

The invention is based on the fact that by using three channels A, B and C the spectral sensitivity curves of which are linear combinations of the respective curves of the channels R, G and B, the luminances of the tubes are rendered more equal. For example, to the camera tube for "blue" a "white" part may also be applied. Alternatively, a "green" part may be applied to the "red" camera tube.

This results in that the operating points of the tubes become more equal. Further, the response times are rendered more equal, i.e. equal to the lowest response time.

Subsequently, from the signals of the camera tubes in the channels A, B and C the signals produced in the camera tubes of the channels R, G and B may be simply recovered by means of a linear matrix.

In the system shown in FIG. 2, the blue component of light 32 incident through an objective lens 20 is reflected by a dichroic layer 24 coated on the face of a prism 21 more remote from the objective lens. The remainder of the light is transmitted by the dichroic layer, travels through an airgap 25 and enters a second prism 22. The face of this prism more remote from the objective lens is coated with a dichroic layer 26 which reflects red light only. Thus, only the green component of the light incident on the color separating prism system is left and travels through a third prism 23 which is directly cemented to the second prism. Because the forms of the spectral sensitivities of the respective camera tubes in conjunction with the selective effects of the color separating layers are not equal to the desired curves, correcting filters 29, 30 and 31 have been included in the system. These filters have the disadvantage of reducing the signal efficiency of the incident light.

In the prism system shown in FIG. 3, the blue component of incident light 57 is reflected by a dichroic layer 44 of a prism 41. The light transmitted by the layer 44 traverses an airgap 45 to strike a partially reflecting layer coated on a face 49 of a prism 42. The rays reflected by the dichroic and partially reflecting layers are reflected at a total reflecting layer 48, emerge from the prism 41 and impinge on a "blue" camera tube 54. Thus, compared with the tube 37 of FIG. 2, the tube 54 receives an additional amount of light, for example 10 percent of light of the composition white-blue if the layer is 10 percent neutrally reflecting.

This is illustrated in FIG. 1 by a curve 11 for the spectral sensitivity distribution of a channel which includes this tube. The curve has been formed by adding 10 percent of the curves 5 and 6 to the curve 7. The slope of the curve 11 is not as steep as that of the curve 7. This slope is in this case obtainable by means of dichroic layers, so that no absorption filters are required and the signal efficiency is increased. Further, the area under the curve 11 is greater than that under the curve 10. This increase is substantially at the expense of the area under the "green" curve 6; in other words, the increase of the blue signal entails a decrease of the green signal. The operating point of the "blue" camera tube will be situated nearer to that of the "green" camera tube. In other word: the response of the "blue" camera tube will be faster.

In order to increase the luminous intensity on the "red" camera tube at the expense of that on the "green" camera tube, an airgap 47 may be provided between the prisms 42 and 43, a partially reflecting layer being coated on the face 50 of the prism 43. If the partially reflecting layer has a 10 percent neutral reflection, the "red" camera tube will receive, in addition to red light, 10 percent of green light.

By the said steps the operating points of the three camera tubes will be nearer to one another and the response times of the tube will become more equal to one another and to the lowest response time, i.e. that of the "green" camera tube.

The partially reflecting layers need not be reflecting throughout their entire surface areas, but they may be in the form of transparent layers provided with small reflecting domains so that, for example, 10 percent of the light incident on the layer is reflected.

Further, the reflecting layers may be made frequency-dependent, so that only light of a given wavelength is reflected.

A disadvantage of the partially reflecting layers might be that at a given width of the airgap two images are projected on the camera tube. The relative spacing of the images is determined by the width of the airgap. This disadvantage can be eliminated by making the airgap so narrow that the images due to reflections at the partially reflecting layer and at the dichroic layer will be so near that the system is incapable of distinguishing them and perceives them as a single image.

Experiments have shown that the provision of two 10 percent neutrally reflecting layers permits increasing the efficiency of the assembly of color separating prism systems and camera tubes in a color television camera to 75 percent, a considerable improvement upon the 45 percent obtainable with the known camera.

What is claimed is:

1. An optical system for a color television camera having a camera tube for each of a plurality of component colors of an object comprising an objective lens and between the objective lens and each tube, a color separating prism system having a non-reflecting optical axis and including a plurality of prisms successively traversed by light, successive prisms being separated from one another traversed air spaces bounded by surfaces of the prisms which intersect the non-reflecting optical axis and at least one of said prisms being separated from said objective lens by an air space, a first dichroic layer adjacent a bounding surface adjoining one of said air spaces and intersecting the non-reflecting optical axis, a second dichroic layer adjacent a bounding surface adjoining another of said air spaces and intersecting the non-reflecting optical axis, said bounding surfaces and said dichroic layers each forming angles of less than 30° with planes which are at right angles to the non-reflecting optical axis, said prisms being so positioned relative to one another that light reflected by a dichroic mirror is totally reflected by an adjacent bounding surface, and a partially reflecting layer adjoining a bounding surface opposite one of said dichroic layers for reflecting a portion of the light transmitted by said dichroic layer.

2. A color separating prism system as claimed in claim 1 wherein an air space is disposed behind the first dichroic layer.

3. A color separating prism system as claimed in claim 1 wherein the said partially reflecting layer comprises a transparent layer having light-reflecting domains therein.

4. A color separating prism system as claimed in claim 1 wherein the said partially reflecting layer is spectrally neutrally reflecting.

5. A color separating prism system as claimed in claim 1 wherein the reflection of the said partially reflecting layer is wavelength dependent.

6. A color separating prism system as claimed in claim 1 wherein an air space is disposed behind the second dichroic layer.

* * * * *